United States Patent
Johnson

(10) Patent No.: US 7,606,850 B2
(45) Date of Patent: Oct. 20, 2009

(54) METHOD AND APPARATUS FOR PROVIDING A BASE-2 LOGARITHM APPROXIMATION TO A BINARY NUMBER

(75) Inventor: J. Andrew Johnson, Newark Valley, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 945 days.

(21) Appl. No.: 11/094,760

(22) Filed: Mar. 30, 2005

(65) Prior Publication Data

US 2006/0224648 A1 Oct. 5, 2006

(51) Int. Cl.
G06F 7/00 (2006.01)
G06F 1/02 (2006.01)

(52) U.S. Cl. .................. 708/277; 708/204

(58) Field of Classification Search .............. None
See application file for complete search history.

(56) References Cited

U.S. PATENT DOCUMENTS

| | | | |
|---|---|---|---|
| 3,436,533 A | 4/1969 | Moore et al. | |
| 3,988,600 A | 10/1976 | Katsuoka et al. | |
| 4,062,014 A | 12/1977 | Rothgordt et al. | |
| 4,626,825 A | 12/1986 | Burleson et al. | |
| 4,720,809 A | 1/1988 | Taylor | |
| 4,852,038 A | 7/1989 | Wagner et al. | |
| 5,041,999 A | 8/1991 | Nakayama | |
| 5,042,001 A | 8/1991 | Brightman et al. | |
| 5,197,024 A | 3/1993 | Pickett | |
| 5,301,138 A | 4/1994 | Lindsley | |
| 5,337,266 A | 8/1994 | Arnold | |
| 5,363,321 A | 11/1994 | Dao Trong et al. | |
| 5,365,465 A | 11/1994 | Larson | |
| 5,600,581 A | 2/1997 | Dworkin et al. | |
| 5,604,691 A | 2/1997 | Dworkin et al. | |
| 5,608,663 A | 3/1997 | Smith | |
| 5,642,305 A | 6/1997 | Pan et al. | |
| 5,657,263 A | 8/1997 | Lloyd et al. | |
| 5,703,801 A | 12/1997 | Pan et al. | |
| 5,721,696 A | 2/1998 | Pan et al. | |
| 5,761,104 A | 6/1998 | Lloyd et al. | |
| 5,771,391 A | 6/1998 | Lloyd et al. | |
| 5,798,957 A | 8/1998 | Pan et al. | |
| 5,923,575 A | 7/1999 | Efrat et al. | |
| 5,936,871 A | 8/1999 | Pan et al. | |
| 5,941,939 A | 8/1999 | Pan et al. | |
| 5,951,628 A | 9/1999 | Pan et al. | |
| 5,951,629 A | 9/1999 | Wertheim et al. | |
| 5,963,460 A | 10/1999 | Rarick | |
| 6,128,638 A | 10/2000 | Thomas | |
| 6,317,764 B1 | 11/2001 | Rarick | |
| 6,581,079 B2 | 6/2003 | Rarick | |
| 2004/0010532 A1 | 1/2004 | Lu | |
| 2004/0024801 A1* | 2/2004 | Hamilton et al. | 708/490 |
| 2004/0122878 A1* | 6/2004 | George | 708/290 |

* cited by examiner

*Primary Examiner*—Lewis A Bullock, Jr.
*Assistant Examiner*—Mark A Gooray
(74) *Attorney, Agent, or Firm*—Antony P. Ng; Dillon & Yudell LLP

(57) ABSTRACT

An apparatus for providing a base-2 logarithm approximation to a binary number is disclosed. A position k of the most significant bit within a binary number is located. Then, all bits that are less significant than position k within the binary number are assigned as a fractional portion of a base-2 logarithm approximation of the binary number. Next, a subset of the fractional portion is utilized to generate an adjustment value $\beta_m$ for the fractional portion. The numeric value k is then converted to a binary value representing an integer portion of the base-2 logarithm approximation of the binary number. Finally, the integer portion is added to the fractional portion along with the adjustment value $\beta_m$ for the fractional portion to form the base-2 logarithm approximation of the binary number.

12 Claims, 2 Drawing Sheets

METHOD AND APPARATUS FOR PROVIDING A BASE-2 LOGARITHM APPROXIMATION TO A BINARY NUMBER

BACKGROUND OF THE INVENTION

1. Technical Field

The present invention relates to computational method and apparatus in general, and in particular to a method and apparatus for providing a base-2 logarithm approximation to a binary number.

2. Description of Related Art

The logarithm of a binary number can be represented by an integer portion (sometimes called the characteristic) and a fractional portion. For a binary number, the integer portion of a base-2 logarithm is equal to the number of bits after the most significant bit of the binary number. For example, for a binary number 0001 1111 1111 0000, there are 12 bits after the most significant bit; thus, the integer portion of the base-2 logarithm is 12 in decimal or 1100 in binary.

Since the integer portion of the base-2 logarithm of a binary number can be easily defined, a barrel shifter can be used to obtain the integer portion of the base-2 logarithm of a binary number. However, the fractional portion of the base-2 logarithm of a binary number requires more effort to acquire.

In the prior art, the fractional portion of the base-2 logarithm of a binary number can be estimated by using a multiplier, two adders and a shifter. But the usage of a multiplier can result in additional cycles of processing time, which may not be suitable for many real-time applications.

There are logarithm approximating circuits that do not utilize multipliers; however, those logarithm approximating circuits typically require two relatively large lookup tables, an adder and a subtractor as well as other components that are costly in terms of size. Consequently, it would be desirable to provide an improved apparatus for providing a base-2 logarithm approximation to a binary number. The improved apparatus should occupy a relatively small footprint and should require minimal hardware computation cycles.

SUMMARY OF THE INVENTION

In accordance with a preferred embodiment of the present invention, a position k of the most significant bit within a binary number is located. Then, all bits that are less significant than position k within the binary number are assigned as a fractional portion of a base-2 logarithm approximation of the binary number. Next, a subset of the fractional portion is utilized to generate an adjustment value $\beta_m$ for the fractional portion. The numeric value k is then converted to a binary value representing an integer portion of the base-2 logarithm approximation of the binary number. Finally, the integer portion is added to the fractional portion along with the adjustment value $\beta_m$ for the fractional portion to form the base-2 logarithm approximation of the binary number.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
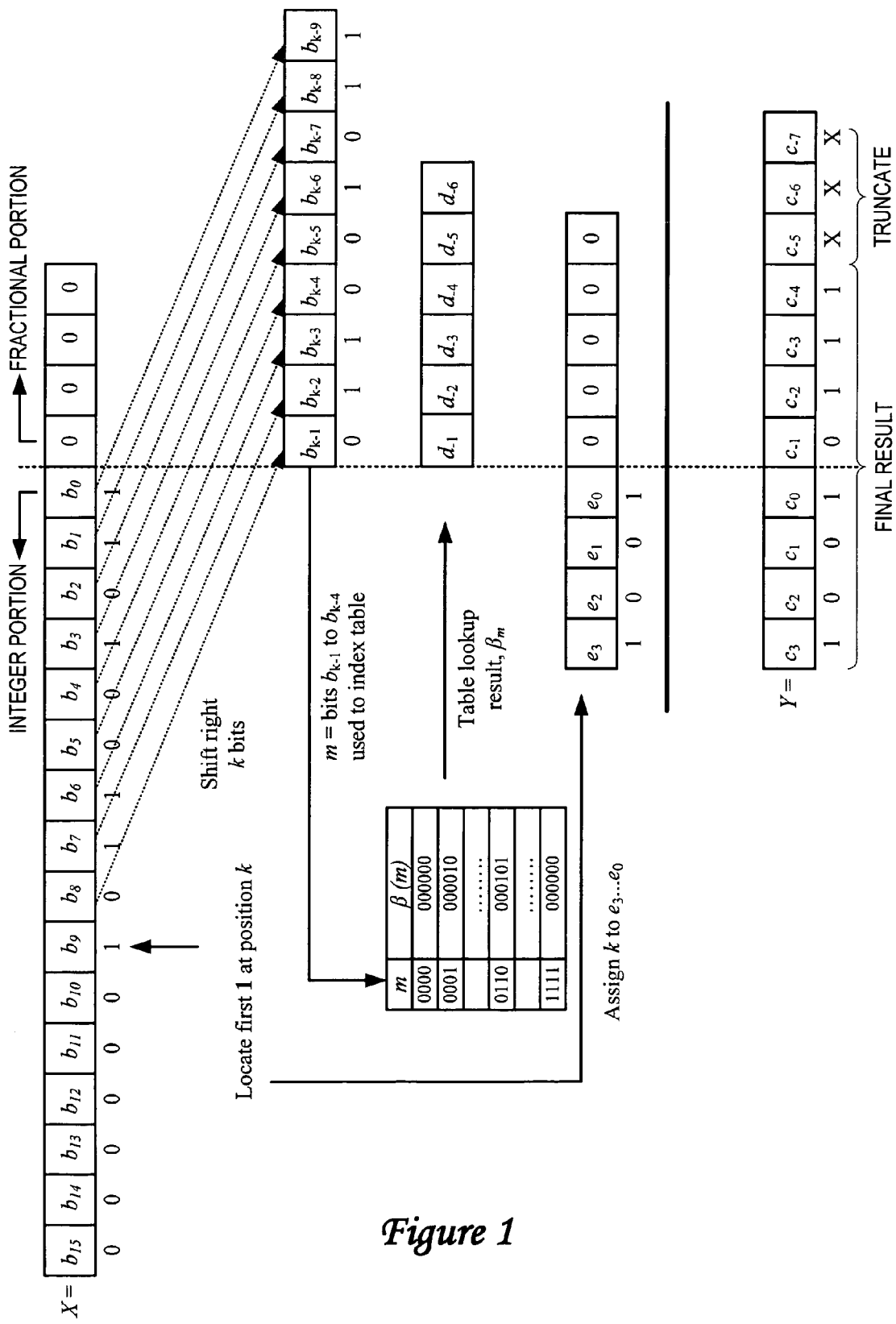
FIG. 1 graphically depicts a method for providing a base-2 logarithm approximation to a binary number, in accordance with a preferred embodiment of the present invention.

I. Mathematical Approximation of a Base-2 Logarithm

An infinitely differentiable function can be exactly represented by its Taylor Series Expansion about $x_0$, $$f(x) = \sum_{n=0}^{\infty} \frac{(x-x_0)^n}{n!} f^{(n)}(t) \Big|_{t=x_0}$$

in which $f^{(n)}(x)$ is the $n^{th}$ order derivative of $f(x)$. Consider a base-2 logarithm function $$f(x) = \log_2 x = \frac{\ln x}{\ln 2}$$

and noting that $$f^{(0)}(x) = \frac{\ln x}{\ln 2}$$

$$f^{(1)}(x) = \frac{1}{x \ln 2}$$

$$f^{(2)}(x) = (-1) \frac{1}{x^2 \ln 2},$$

$$\vdots$$

$$f^{(n)}(x) = \frac{n!}{n} (-1)^{n-1} \frac{1}{x^n \ln 2}$$

the Taylor Series Expansion about $x_0$ is $$f(x) = \frac{\ln(x_0)}{\ln 2} + \frac{1}{\ln 2} \sum_{n=1}^{\infty} \frac{(x-x_0)^n}{n!} \frac{n!}{n} \frac{1}{x_0^n}$$

$$= \log_2 x_0 + \frac{1}{\ln 2} \sum_{n=1}^{\infty} \frac{(-1)^{n-1}}{n} \left( \frac{x-x_0}{x_0} \right)^n$$

It is a common approximation technique to truncate the above-mentioned series to a few elements. When only the first two elements are used, the approximation is called a linear approximation. Generally speaking, linear approximation is accurate in the neighborhood of $x_0$. As $|x-x_0|$ becomes larger, the error of linear approximation becomes larger also.

An extension of the linear approximation technique can be utilized to approximate a function in a piecewise linear fashion by choosing intervals and the associated $x_0$ values judiciously. Since numbers are stored in a data processing system as binary digits, it is more convenient to choose intervals that have their endpoints in the powers of 2 (i.e., octaves). So in order to approximate a function, intervals are chosen in the form of $[2^k, 2^{k+1})$ and let $x_0 = 2^k / \ln 2$, where k is an integer. The function approximation then becomes $$f(x) \approx f^*(x) = \log_2 \frac{2^k}{\ln 2} + \frac{1}{\ln 2} \frac{\ln 2}{2^k} x - \frac{1}{\ln 2}$$

$$= k + \frac{x}{2^k} - \log_2(\ln 2) - \frac{1}{\ln 2}, \; 2^k \leq x < 2^{k+1}$$

In order to achieve a better approximation, according to a preferred embodiment of the present invention, the intervals are further divided into sub-intervals, with a shift correction for each sub-interval. For example, the primary interval is divided into M sub-intervals as follows:

$$I_{k,m} = \left[ 2^k \left(1 + \frac{m}{M}\right), 2^k \left(1 + \frac{m+1}{M}\right) \right) m = 0, 1, \ldots, M-1.$$

Thus, the function approximation becomes $$f^*(x) = k + \frac{x}{2^k} - \log_2(\ln 2) - \frac{1}{\ln 2} - \beta_{k,m}, \; x \in I_{k,m}$$

where $\beta_{k,m}$ is the shift correction for an interval $I_{k,m}$.

The ideal sub-interval shift corrections for a minimum error span (the largest positive error and the largest negative error have the same magnitude over a sub-interval) can be approximated by averaging the errors at the end points of a sub-interval, as follows:

$$\beta_{k,m} = \frac{1}{2}(f^*(x) - f(x)) \Big|_{2^k(1+\frac{m}{M})} + \frac{1}{2}(f^*(x) - f(x)) \Big|_{2^k(1+\frac{m+1}{M})}$$

$$= k - \log_2(\ln 2) - \frac{1}{\ln 2} + \frac{1}{2} \left[ \frac{2^k \left(1 + \frac{m}{M}\right)}{2^k} + \frac{2^k \left(1 + \frac{m+1}{M}\right)}{2^k} \right] -$$

$$\frac{1}{2} \log_2 \left[ 2^{2k} \left(1 + \frac{m}{M}\right)\left(1 + \frac{m+1}{M}\right) \right]$$

$$= k - \log_2(\ln 2) - \frac{1}{\ln 2} + \frac{1}{2}\left(2 + \frac{2m+1}{M}\right) - k - \frac{1}{2} \log_2$$

$$\left[\left(1 + \frac{m}{M}\right)\left(1 + \frac{m+1}{M}\right)\right]$$

$$= -\log_2(\ln 2) - \frac{1}{\ln 2} + 1 + \frac{m + \frac{1}{2}}{M} - \frac{1}{2} \log_2 \left[\left(1 + \frac{m}{M}\right)\left(1 + \frac{m+1}{M}\right)\right]$$

With the above-mentioned equation, $\beta_{k,m}$ depends only on m and does not depend on k. Furthermore, for a given sub-interval m, $\beta_{k,m}$ is simply a constant, which can be combined with the other constants in the approximation to yield a new shift correction (with a sign change imposed), as follows:

$$\beta_m = \frac{1}{2} \log_2 \left[\left(1 + \frac{m}{M}\right)\left(1 + \frac{m+1}{M}\right)\right] - \frac{m + \frac{1}{2}}{M}$$

As a result, the base-2 logarithm approximation becomes $$f^*(x) = k + \frac{x - 2^k}{2^k} + \beta_m, \; x \in I_{k,m}$$

II. Hardware Implementation of a Base-2 Logarithm

Because digital hardware uses numbers having a finite precision, the truncation of values to a fixed number of bits may present another source of error. Hence, the number of significant bits to be used in a given process must be addressed. For the present implementation, it is assumed that a non-negative integer X, for which a base-2 logarithm is to be computed, has a precision of 16 bits, and the result Y is limited to a precision of 8 bits.

In addition, the hardware implementation of the base-2 logarithm approximation should have the following properties:

1. When X is zero, the result Y should also be zero because, by convention, logarithm is not defined for an operand of zero.
2. When X is a power of 2 number (i.e., X=1, 2, 4, 8, etc.), the result Y should be exact, i.e., Y=$\log_2$ X.
3. When X takes on its largest possible value, the result Y should also take on its largest possible value.
4. The approximation should be non-decreasing, i.e., if $X_1 < X_2$, then $Y_1 \leq Y_2$.
5. The span of approximation errors should be small, such as close to 1 LSB, where LSB is the precision of the least significant bit of Y.
6. The approximation should be fast, so it can be performed repeatedly in real-time.

Consider a 16-bit binary integer X ($b_{15} \ldots b_0$) for which Y≈$\log_2$ X is to be computed. Suppose that only one of the bits in X (at position k, for example) is set to 1 (i.e., $b_k = 1$), and the rest of bits in X are zero. Then $\log_2$ X=k, which represents an interval boundary. All binary values of the format 0 . . . 01X . . . X (in which the first occurrence of a "1" from the most significant bit of X is at bit position k) lie in the interval $2^k$ to $2^{k+1} - 1$. Furthermore, if the number of sub-intervals M is in a power of 2 (i.e., M=$2^S$), then the next S bits uniquely define the sub-interval (if there are not S bits to the right of $b_k$, integer X is padded on the right with zeros). Let k (position of the first occurrence of a "1" from the most significant bit of X) be referred to as the exponent of X, and all the bits to its right (i.e., $b_{k-1}, \ldots, b_0$) are the fractional portion.

Next, consider possible range of result Y. If integer X has all 1s, then X=$2^{16}-1$, and result Y is less than 16. If integer X is 0, then result Y is defined to be zero because the base-2 logarithm is not defined for zero. If integer X takes its smallest possible positive value (i.e., X=1), then result Y=0. Therefore, four bits are required to hold the integer portion of result Y; the remaining four bits of result Y are used for the fractional portion. Now, the integer portion of result Y has k, the exponent of X, as its major contributor. The fractional portion of result Y can be determined by using the logarithm approximation technique mentioned previously. The method for performing logarithm approximation is graphically depicted in FIG. 1.

Referring now to the drawings and in particular to FIG. 1, there is graphically depicted a method for providing a base-2 logarithm approximation to a binary number, in accordance with a preferred embodiment of the present invention. As shown, a 16-bit binary integer X ($b_{15} \ldots b_0$) for which a base-2 logarithm approximation is to be computed. First, a first occurrence of a "1" from the most significant bit (MSB)

of X at position k (i.e., $b_k=1$) is located. In the present example, the first occurrence of a "1" from the MSB of X is at position 9 (i.e., $b_9=1$). Then, all the bits to the right of position k (i.e., $b_{k-1}, \ldots, b_0$) are shifted k bits to the right into the fractional portion. In the present example, $b_8, \ldots, b_0$ are shifted 9 bits to the right into the fractional portion. As a result, the numeric value k represents the integer portion of the logarithm approximation of X, and all bits to the right of position k (i.e., $b_{k-1}, \ldots, b_0$) become the fractional portion of the logarithm approximation of X.

Next, sub-interval m bits are chosen from the fractional portion to calculate $\beta_m$ as follows:

$$\beta_m = \frac{1}{2}\log_2\left[\left(1 + \frac{m}{M}\right)\left(1 + \frac{m+1}{M}\right)\right] - \frac{m + \frac{1}{2}}{M}$$

In order to reduce processing time, the values of $\beta_m$ are preferably pre-calculated with appropriate bit precision and are arranged in the form of a lookup table. For example, a sub-interval 4 bits ($b_8 \ldots, b_5$) are chosen from the fractional portion to index to a lookup table to generate a $\beta_m$ of 000101 for adjusting the fractional portion of the logarithm of X. The number of bits of precision to which the values of $\beta_m$ are stored in the lookup table can be determined by experimentation.

Since the numeric value k represents the exponent of the logarithm of X, the numeric value k is converted to a binary number to form the integer portion of the logarithm approximation of X. In the present example, the numeric value 9 is converted to a binary number 1001 to form the integer portion of the logarithm approximation of X. Finally, the integer portion of the logarithm approximation of X is added to the fractional portion of the logarithm approximation of X along with the adjustment $\beta_m$ to yield a result Y—a base-2 logarithm approximation of X.

Basically, the position of the first non-zero bit $b_k$ in X determines the binary octave k. A bitwise right-shifting of a number by k bits is equivalent to dividing the number by $2^k$. The next four bits to the right of $b_k$ (i.e., $b_{k-1}, \ldots, b_{k-4}$) determine m that is used to compute $\beta_m$ by a table lookup. The sum of the fractional components may result in a bit being carried over into the integer portion.

Figure 2:
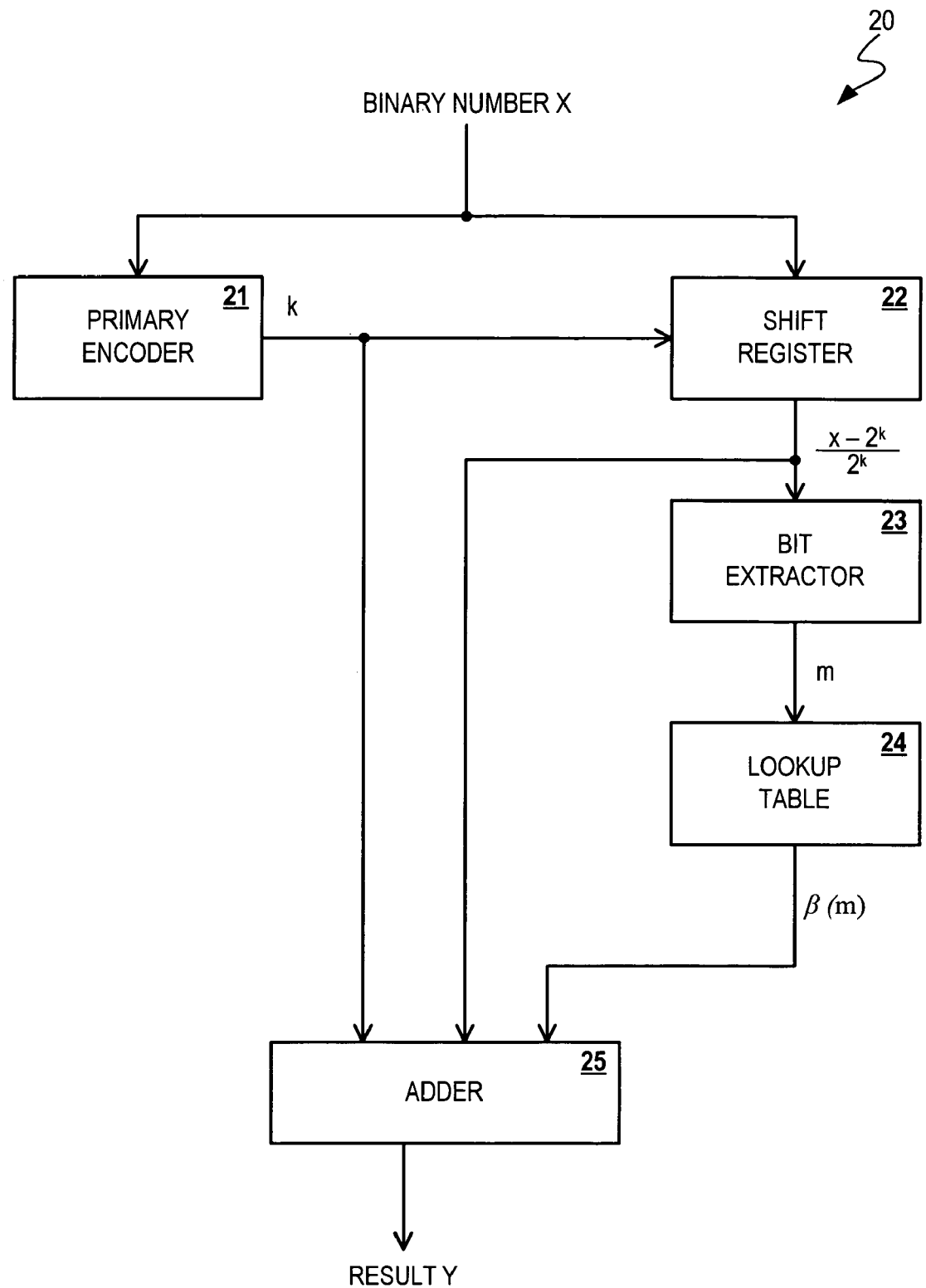
FIG. 2 is a block diagram of an apparatus for providing a base-2 logarithm approximation to a binary number, in accordance with a preferred embodiment of the present invention.

With reference now to FIG. 2, there is depicted a block diagram of an apparatus for providing a base-2 logarithm approximation to a binary number, in accordance with a preferred embodiment of the present invention. As shown, an apparatus 20 includes a primary encoder 21 and a shifter register 22. Apparatus 20 also includes a bit extractor 23, a lookup table 24 and an adder 25.

A binary number X is initially sent to primary encoder 21 and shifter register 22. Shifter register 22 shifts the bits within binary number X according to the value k derived from primary encoder 21. Bit extractor 23 grabs m bits from the result of shift register 22 (i.e., $[X-2^k]/2^k$) for indexing into lookup table 24 to yield an adjustment $\beta_m$. Value k from primary encoder 21, the result from shift register 22 and adjustment $\beta_m$ from lookup table 24 are added together by adder 25, with appropriate scaling, to form a result Y as the base-2 logarithm approximation of X.

As has been described, the present invention provides a method and apparatus for providing a base-2 logarithm approximation to a binary number. Since converting from a logarithm of one base to a logarithm of another base only requires a multiplication of a scaling factor, no generality is lost by developing an approximation only for the base-2 logarithm of a binary input.

Although the present invention has been described in the context of a hardware system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. An apparatus for approximating a base-2 logarithm of a binary number, said apparatus comprising:
   a primary encoder for determining a position k within said binary number at which a "1" is first occurred;
   a shift register for assigning all bits to the right of said position k within said binary number as a fractional portion of a base-2 logarithm approximation of said binary number;
   a lookup table for utilizing a subset of said fractional portion to generate an adjustment value βm for said fractional portion;
   wherein said lookup table further includes means for utilizing said subset of said fractional portion to generate said adjustment value βm by $$\beta_m = \frac{1}{2}\log_2\left[\left(1 + \frac{m}{M}\right)\left(1 + \frac{m+1}{M}\right)\right] - \frac{m + \frac{1}{2}}{M}$$

where m is said subset of said fractional portion; and
   an adder for adding said fractional portion along with said adjustment value βm for said fractional portion to said k as a binary number representing an integer portion of said base-2 logarithm approximation of said binary number to form said base-2 logarithm approximation of said binary number.

2. The apparatus of claim 1, wherein said primary encoder further includes means for determining said position k from the most significant bit within said binary number at which said "1" is first occurred.

3. The apparatus of claim 1, wherein said shift register further includes means for right-shifting all bits to the right of said position k within said binary number k positions.

4. The apparatus of claim 1, wherein m equals $[X-2^k]/2^k$, where X is binary number.

5. An apparatus for approximating a base-2 logarithm of a binary number, said apparatus comprising:
   means for determining a position k within said binary number at which a "1" is first occurred;
   means for assigning all bits to the right of said position k within said binary number as a fractional portion of a base-2 logarithm approximation of said binary number;
   means for utilizing a subset of said fractional portion to generate an adjustment value βm for said fractional portion;

wherein said means for utilizing further includes means for utilizing said subset of said fractional portion to generate said adjustment value βm by $$\beta_m = \frac{1}{2}\log_2\left[\left(1 + \frac{m}{M}\right)\left(1 + \frac{m+1}{M}\right)\right] - \frac{m + \frac{1}{2}}{M}$$

where m is said subset of said fractional portion; and means for adding said fractional portion along with said adjustment value βm for said fractional portion to said k as a binary number representing an integer portion of said base-2 logarithm approximation of said binary number to form said base-2 logarithm approximation of said binary number.

6. The apparatus of claim 5, wherein said means for determining further includes means for determining said position k from the most significant bit within said binary number at which a "1" is first occurred.

7. The apparatus of claim 5, wherein said means for assigning further includes means for right-shifting all bits to the right of said position k within said binary number k positions.

8. The apparatus of claim 5, wherein said m equals $[X-2^k]/2^k$, where X is binary number.

9. A recordable type signal bearing media having a computer program product for approximating a base-2 logarithm of a binary number comprising:

computer program code for determining a position k within said binary number at which a "1" is first occurred;

computer program code for assigning all bits to the right of said position k within said binary number as a fractional portion of a base-2 logarithm approximation of said binary number;

computer program code for utilizing a subset of said fractional portion to generate an adjustment value βm for said fractional portion;

wherein said computer program code for utilizing further includes computer program code for utilizing said subset of said fractional portion to generate said adjustment value βm by $$\beta_m = \frac{1}{2}\log_2\left[\left(1 + \frac{m}{M}\right)\left(1 + \frac{m+1}{M}\right)\right] - \frac{m + \frac{1}{2}}{M}$$

where m is said subset of said fractional portion; and computer program code for adding said fractional portion along with said adjustment value βm for said fractional portion to said k as a binary number representing an integer portion of said base-2 logarithm approximation of said binary number to form said base-2 logarithm approximation of said binary number.

10. The computer usable medium of claim 9, wherein said computer program code for determining further includes computer program code for determining said position k from the most significant bit within said binary number at which a "1" is first occurred.

11. The computer usable medium of claim 9, wherein said computer program code for assigning further includes computer program code for right-shifting all bits to the right of said position k within said binary number k positions.

12. The computer usable medium of claim 9, wherein said m equals $[X-2^k]/2^k$, where X is binary number.

* * * * *